Nov. 16, 1948.  C. E. BURT  2,453,891
PRESSURE RELEASE
Filed Jan. 8, 1945
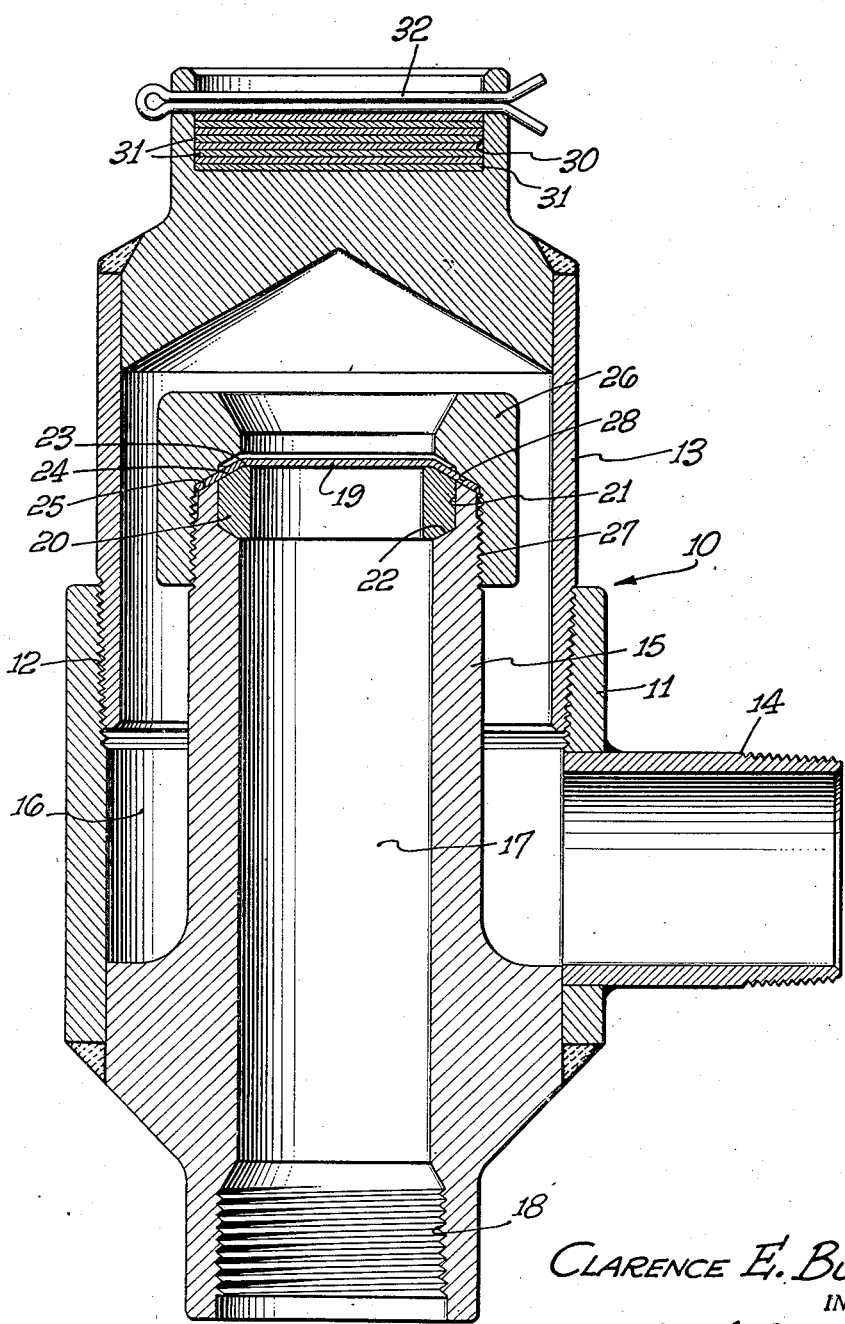
CLARENCE E. BURT,
INVENTOR.
BY H. Calvin White
ATTORNEY.

Patented Nov. 16, 1948

2,453,891

UNITED STATES PATENT OFFICE 2,453,891

PRESSURE RELEASE

Clarence E. Burt, Pasadena, Calif., assignor to Grant Oil Tool Company, Los Angeles, Calif., a corporation of California Application January 8, 1945, Serial No. 571,931

6 Claims. (Cl. 220—89)

1

This invention has to do with pressure release devices of the general type comprising a normally intact or effective sealing member, such as a metallic disc, capable of withstanding fluid pressures up to a predetermined maximum at which the disc "fails" and releases the pressure. The various uses for such devices, notably as safety fittings or attachments in high pressure fluid lines, are common knowledge.

My principal objectives are normally to assure a fluid-tight seal between the disc and its seat, and to clamp the peripheral portion of the disc with such security as to prevent its release at pressures below the pressure at which the disc is intended to fail.

Particularly, the invention aims to provide an improved pressure release device in which the disc seats in the direction of the applied high pressure, so that the pressure is itself directly effective to maintain the fluid-tight disc seal and to increase the tightness of the seal as the pressure increases.

Maintenance of the peripheral portion of the disc in securely held condition is effected by clamping the disc in such condition that its outer extent is deflected relative to that portion inside the disc seat, angularly in the direction of pressure application against the disc. In accordance with a preferred construction, the device embodies a removable disc seat retained in an annular recess in the body and having a disc-engaged surface extending radially outward and angularly in the direction of pressure application. By clamping the disc at the outside of the seat, and preferably against a body surface having angularity in the same direction as the disc-engaged surface of the seat, the disc is effectively gripped against withdrawal from the clamp by reason of the resistance of the deflected portion of the disc to inward displacement by the angular surfaces of its seats.

Another feature is an improved body structure comprising a cap section removable to permit open access to the disc and seat parts, and having an outside recess for containing a number of replacement discs.

These and further objects and details of the invention will be understood from the following description of a preferred embodiment shown in vertical section in the accompanying drawing.

In the typical form illustrated, the device comprises a body 1 consisting of a section 11 connected by threaded joint 12 with a removable cap section 13. The body section 11 carries an inlet nipple 14 adapted to be connected to any high pressure fluid line such as the discharge pipe of a high pressure mud pump used in well drilling operations. The

2 body structure also includes an integral inner tubular portion 15 annularly spaced at 16 from the outer portion of the body and containing a passage or bore 17 leading to the threaded outlet opening 18.

Communication between the inlet 14 and outlet 18 normally is sealed by a disc 19 of suitable metal or alloy applied to the upper end of the inner body portion 15. The disc is retained against a removable annular seat 20 received within counterbore 21 and engaged against the angular body shoulder 22. An important feature of the invention is the shape given the disc-engaged surface of the seat, so that the disc is clamped and held against the seat in a deflected condition such that the outer portion of the disc extends angularly in the direction of pressure application against the disc, i. e. downwardly as viewed in the drawing. Preferably the seat 20 has an inner substantially flat surface 23 extending radially a relatively short distance, and an outer angular surface 24 of greater radial extent. The peripheral portion of the disc engages against the body surface 25 which preferably also extends angularly and in substantial alinement with surface 24 of the seat. The disc is tightly clamped outside the seat and against surface 25 by a nut 26 threaded at 27 on the inner body portion and having an angular shoulder 28 bearing against the disc.

It will be noted that the high fluid pressure acts to press and seal the disc against its seat 20, and that the tightness of the pressure-created seal increases as the pressure increases. The tendency of the pressure application against the disc is to deflect the inner portion of the disc downwardly within the seat 20. My primary objective in clamping the outer portion of the disc in the described deflected condition is to assure retention of the disc against any tendency to pull away from the clamp at any pressure lower than the predetermined pressure at which the disc is intended to fail. The turned or deflected condition of the clamped outer portion of the disc presents a resistance to such pulling away as to assure that the central portion of the disc will fail before its release from clamped engagement by the nut.

The invention embodies a further novel feature in the provision within the body cap section 13 of an exterior opening or recess 30 to contain a number of replacement discs 31. The latter may be suitably retained within the body recess, as by cotter key 32 bridging across the recess. When it becomes necessary to replace the disc 19, cap section 13 may be removed and the clamping nut and associated parts thus rendered directly accessible for removal and replacement of the disc. And the replacement disc is immediately available out of the cap-contained recess.

I claim:

1. A pressure release device comprising a body having inlet and outlet openings, a disc within the body and normally closing communication between said openings, an annular seat against which the disc is pressed by fluid pressure communicated from said inlet opening, said seat having an inner end removably contained within a recess in the body and having an outer end surface against which the disc seats and extends radially outward and angularly in the direction of pressure application against the disc to engagement with a body surface surrounding the end of said recess, and means tightly clamping the annular portion of the disc beyond said seat against said body surface.

2. A pressure release device comprising a body having inlet and outlet openings, a disc within the body and normally closing communication between said openings, an annular seat having an inner end removably received within a recess in the body and having an outer end surface against which the disc is pressed by fluid pressure communicated from said inlet opening, said seat and an end portion of the body surrounding said recess having disc-engaged surfaces extending radially outward and angularly in the direction of pressure application against the disc, and a nut threaded on the body and engaging and clamping against said body surface the annular portion of the disc beyond said seat.

3. A pressure release device comprising a body including an outer portion having an inlet opening and an inner tubular portion annularly spaced from said outer portion and communicating with an outlet opening, a disc normally closing communication between said openings, an annular removable seat received within a recess inside said inner body portion and against which the disc is pressed by fluid pressure communicated from said inlet opening, said seat and the surrounding portion of the body having disc-engaged surfaces extending radially outward and angularly in the direction of pressure application against the disc, and a nut threaded on said inner body portion and engaging and clamping against said body surface the annular portion of the disc beyond said seat, said inlet and outlet being communicable through the annular space between said body portions upon rupture of the disc.

4. A pressure release device comprising a body having inlet and outlet openings and an intermediate tubular portion presenting an end surface surrounding an annular recess, an annular rigid disc seat member removably contained in said recess and having an outer end surface against which the disc is pressed by fluid pressure communicated from said inlet opening, the last mentioned surface extending beyond said end surface of the body, a disc seating against and extending radially beyond said end surface of the seat member, and a nut threaded on the outside of said body portion and clamping the outer portion of the disc against said end surface of the body.

5. A pressure release device comprising a body having inlet and outlet openings and an intermediate tubular portion presenting an end surface surrounding an annular recess, an annular rigid disc seat member removably contained in said recess and having an outer end surface against which the disc is pressed by fluid pressure communicated from said inlet opening, the last mentioned surface extending beyond said end surface of the body, a disc seating against and extending radially beyond said end surface of the seat member, and a nut threaded on the outside of said body portion and clamping the outer portion of the disc against said end surface of the body, both said end surfaces of the body and seat member extending outwardly and angularly in the direction of pressure application against the disc.

6. A pressure release device comprising a body having inlet and outlet openings and an intermediate tubular portion presenting one end surface surrounding an annular recess, an annular rigid seat member removably contained in said recess and having an inside diameter less than that of the tubular portion adjacent said annular recess and having a surface extending beyond said end surface of the body, a disc with its annular outer portion pressed by fluid pressure communicated from said inlet opening upon said seat and extending radially beyond the seat's end surface, and means tightly clamping the annular outer portion of the disc against the seat and end surface of the body.

CLARENCE E. BURT.

REFERENCES CITED

The following references are of record in the file of this patent:

UNITED STATES PATENTS

| Number | Name | Date |
|---|---|---|
| 138,171 | Matthews | Apr. 22, 1873 |
| 568,680 | Henderson | Sept. 29, 1896 |
| 776,834 | Goebel | Dec. 6, 1904 |
| 1,022,301 | Campbell | Apr. 2, 1912 |
| 1,248,578 | Vuillemier | Dec. 4, 1917 |
| 1,930,960 | Raymond | Oct. 17, 1933 |
| 1,954,285 | Denk et al. | Apr. 10, 1934 |
| 2,001,686 | Moore et al. | May 14, 1935 |